2,897,026

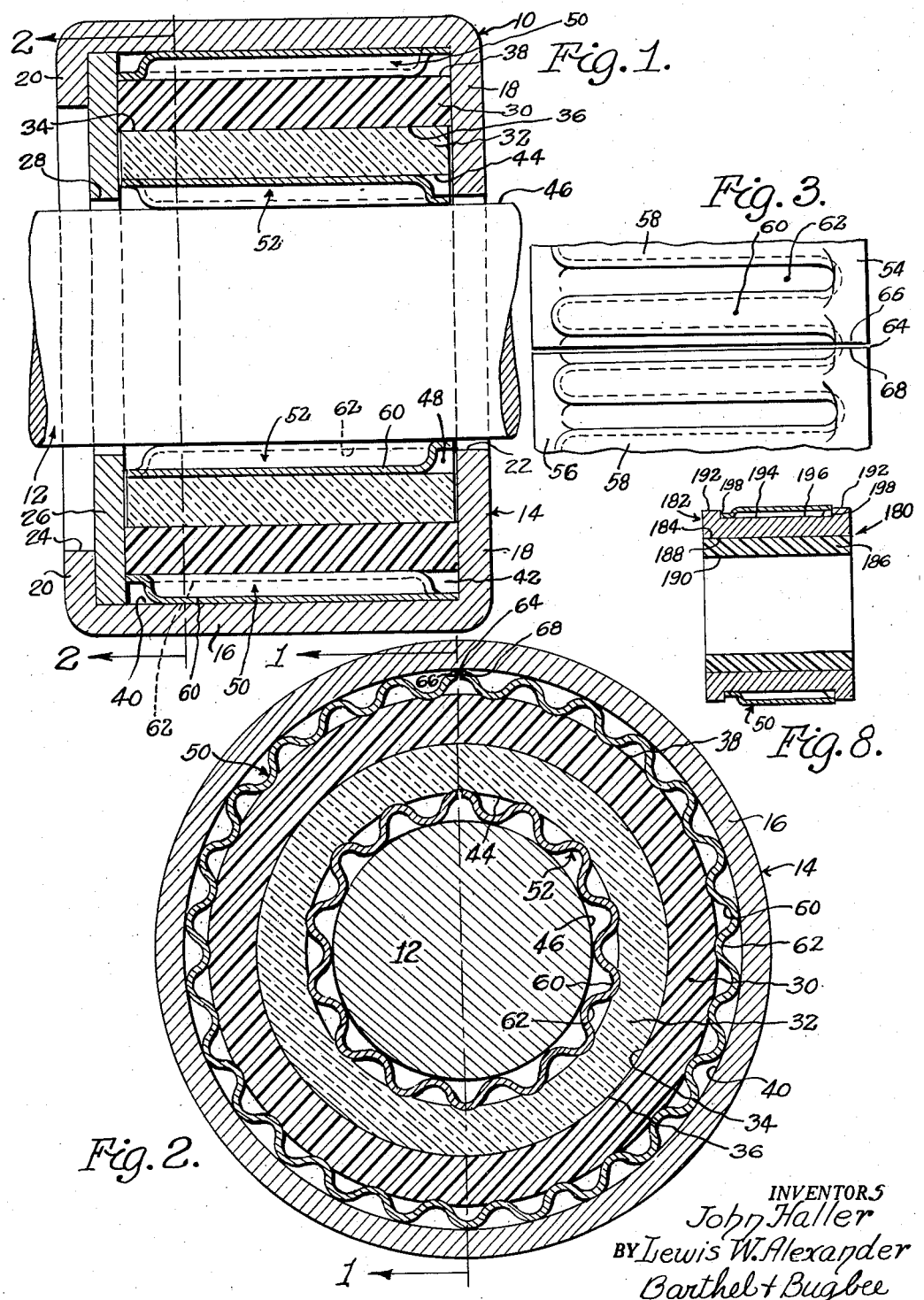
July 28, 1959 J. HALLER ET AL 2,897,026
EXPANSION COMPENSATING SLEEVE BEARING UNIT
Filed June 13, 1955 2 Sheets-Sheet 1
INVENTORS
John Haller
BY Lewis W. Alexander
Barthel + Bugbee
Attys July 28, 1959 J. HALLER ET AL 2,897,026
EXPANSION COMPENSATING SLEEVE BEARING UNIT
Filed June 13, 1955 2 Sheets-Sheet 2
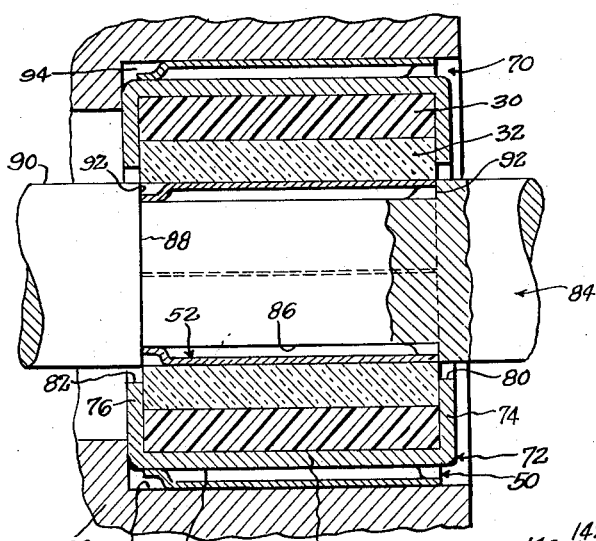
Fig. 4.
Fig. 5.
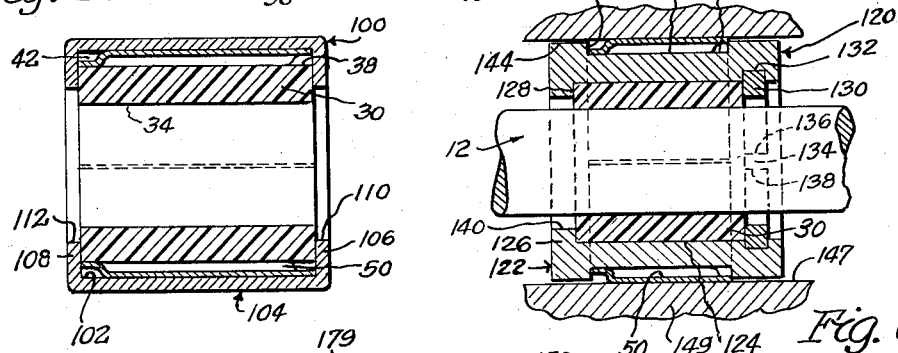
Fig. 6.
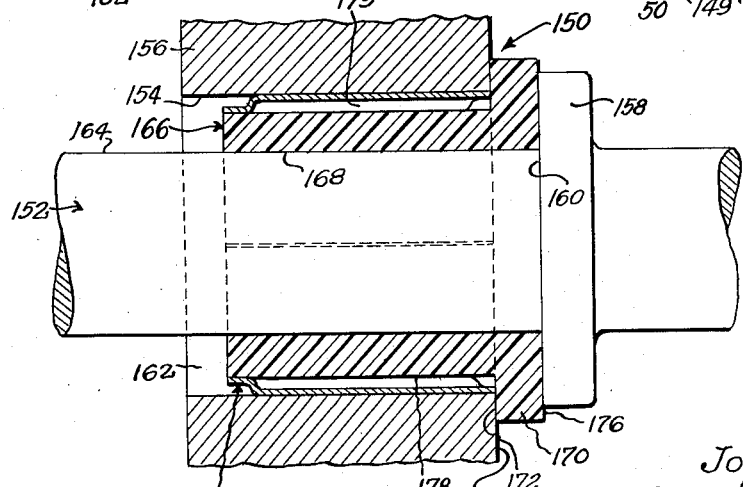
Fig. 7.
INVENTORS
John Haller
BY Lewis W. Alexander
Barthel + Bugbee
Attys United States Patent Office 2,897,026
Patented July 28, 1959

EXPANSION COMPENSATING SLEEVE BEARING UNIT

John Haller and Lewis W. Alexander, Northville, Mich., assignors to Halex Corporation, a corporation of Michigan Application June 13, 1955, Serial No. 515,108

9 Claims. (Cl. 308—238)

This invention relates to bearings and, in particular, to sleeve bearings made from materials having high coefficients of thermal expansion.

Hitherto, sleeve bearings employing certain bearing materials have been unsatisfactory because of their high coefficients of thermal expansion and the consequent large changes in their dimensions resulting from the thermal expansion occurring from the heat of friction generated when they are running. Among these otherwise satisfactory bearing materials is the polymeric amide plastic known commercially as "nylon" and which, while characterized by extreme toughness and strength, nevertheless undergoes such excessive differential expansion under rising temperature conditions as to cause the nylon parts to bind against the metallic parts. The present invention provides such a bearing having means therein for absorbing the excessive clearances necessarily left in a nylon bearing in order to compensate for this differential expansion and prevent excessive tightness and binding when the bearing is warm.

Accordingly, one object of this invention is to provide a nylon sleeve bearing equipped with a thermal expansion compensating member which is especially well adapted to fit into a clearance space between the nylon bearing sleeve and the adjacent metallic part coacting therewith, being so constructed as to be collapsible and expansible under the expansion and contraction of the nylon bearing member, thereby compensating for the otherwise unsatisfactory effect of heat upon a nylon bearing and providing proper clearances for the relatively rotating parts at all times.

Another object is to provide a nylon sleeve bearing of the foregoing character equipped with a thermal expansion compensating member with or without an associated bearing sleeve of high temperature glass or other material suitably cooperative with nylon for bearing purposes.

Another object is to provide a rotary shaft bearing of the foregoing character wherein the shaft carries one bearing sleeve and the housing another bearing sleeve rotatably engaged thereby, one of these sleeves being nylon and the other being a suitable cooperative bearing material, such as high temperature glass, each sleeve being separated from its adjacent mounting surface by an annular clearance containing a thermal expansion compensating member.

Another object is to provide a rotary shaft bearing of the foregoing character which provides vibration isolation with a consequently low noise level, compensates for and accommodates slight misalignments of parts, provides for circulation of air or other gas in a direction parallel to the axis of rotation and close to the bearing surfaces so as to facilitate cooling thereof, and maintains predetermined clearances between the bearing surfaces which remain unaffected by assembly operations.

Another object is to provide a sleeve bearing of the foregoing character incorporating a nylon sleeve together with one or more thermal expansion compensating members, with or without a sleeve of high temperature glass or other unusual bearing materials, all contained in a cartridge or retaining shell which maintains the parts in proper relationship for installation and subsequent operation, this shell also protecting the ends of the bearing from the entry of dirt and other comparable foreign matter.

Another object is to provide a sleeve bearing of the foregoing character including an excessively expansible nylon sleeve and one or more thermal expansion compensating members, the bearing being constructed and arranged for the absorption of end thrust as well as rotational and radial loads.

Other objects and advantages of the invention will become apparent during the course of the following description of the accompanying drawings, wherein:

Figure 1 is a central vertical section through an encased self-compensating nylon-and-glass sleeve bearing, according to one form of the invention;

Figure 2 is a vertical cross-section taken along the line 2—2 in Figure 1;

Figure 3 is a fragmentary top plan view of a portion of the thermal expansion compensating members used in the sleeve bearing of Figures 1 and 2;

Figure 4 is a central vertical section through a modified encased self-compensating nylon-and-glass sleeve bearing, according to the invention;

Figure 5 is a central vertical section through a further modified encased self-compensating sleeve bearing of nylon alone, according to the invention;

Figure 6 is a central vertical section through a still further modified nylon sleeve bearing according to the invention, employing a metallic mounting sleeve;

Figure 7 is a central vertical section through an additionally modified nylon sleeve thrust bearing especially adapted for the absorption of end thrust in a rotating shaft installation, according to the invention; and Figure 8 is a central vertical section through another form of composite metallic and nylon sleeve bearing, according to the invention.

Referring to the drawings in detail, Figures 1 to 3 inclusive show an encased expansion compensating bearing, generally designated 10, rotatably supporting a shaft or other rotary member 12 connected to any suitable and conventional mechanism (not shown). The bearing 10 consists of an approximately cylindrical or cup-shaped casing or housing 14 in the form of a stamped sheet metal shell, consisting of a cylindrical peripheral portion 16 having annular rear and front walls 18 and 20 integral therewith. The rear wall 18 has a relatively small diameter central aperture 22 closely surrounding the shaft 12, whereas the front wall 20 has a relatively large diameter aperture 24 spaced radially a considerable distance away from the shaft 12. This results from the fact that the rear wall 18 is an abutment as well as a retaining member, whereas the front wall 20 is merely a turned-over flange formed after all of the parts of the bearing 10 have been assembled, the retaining function at the front being performed by an annular retaining disc 26, the periphery of which is engaged by the front wall or flange 20 and the center of which has a relatively small diameter aperture 28 closely surrounding the shaft 12, like the small diameter aperture 22 in the rear wall 18.

Mounted between the rear wall 18 and the retaining disc 26 are two concentric outer and inner substantially cylindrical bearing sleeves or members 30 and 32 respectively, the bearing member 30 being preferably of the polymeric amide plastic known commercially as "nylon" and the inner sleeve 32 being preferably of high-temperature glass. The inner cylindrical surface 34 of the nylon bearing sleeve 30 rotatably engages the outer cylindrical surface 36 of the high temperature glass bearing sleeve 32, in the presence of any suitable lubricant such as conventional lubricating oil or grease. The outer cylindrical surface 38 of the nylon outer bearing sleeve 30 is spaced radially away from the inner surface 40 of the cylindrical portion 16 of the bearing casing 14, leaving an annular clearance chamber or space 42 therebetween. Similarly, the inner cylindrical surface 44 of the inner high temperature glass bearing sleeve 32 is spaced away from the outer surface 46 of the shaft 12 by an annular clearance chamber or space 48.

Mounted in the annular outer and inner clearance chambers or spaces 42 and 48 respectively are outer and inner thermal expansion compensating members, generally designated 50 and 52 respectively. These annular compensating members 50 and 52 are of generally similar construction, differing mainly in their diameters, hence a single description will suffice for both.

The thermal expansion compensating member 50 or 52, a section of which is shown in top plan view in Figure 3, is in the form of an undulatory split sleeve having generally cylindrical opposite edge bands 54 and 56 respectively and an undulatory central portion 58 consisting of alternately outward and inward undulations 60 and 62 respectively disposed in oppositely undulating directions with respect to the mean cylinder exemplified by either of the edge bands 54 or 56. Each of the thermal expansion members 50 and 52 is discontinuous—that is, the periphery is broken by a gap 64 between opposite ends 66 and 68 respectively (Figures 2 and 3). The members 50 and 52 are preferably made of spring material, such as spring steel, and the casing 14 of stamped sheet metal, such as sheet steel.

The modified encased expansion compensating bearing, generally designated 70, of Figure 4 is generally similar to the form shown in Figures 1 to 3 inclusive insofar as the outer and inner bearings sleeves 30 and 32 and the outer and inner thermal expansion compensating members 50 and 52 are concerned. In the encased bearing 70, however, the casing, generally designated 72, of aluminum or other suitable material, has rear and front walls 74 and 76 integral with the central cylindrical portion 78 and of substantially the same radial widths, each having a small diameter central aperture 80 and 82 respectively closely surrounding the shaft 84. The latter differs from the shaft 12 in having a central reduced diameter portion 86 of substantially the same length as the nylon sleeve 30 and high temperature glass sleeve 32 as well as that of the inner expansion compensating member 52, which is seated in the annular groove 88 formed thereby between the main surface 90 of the shaft 84 and the reduced diameter surface 86 and abutting the radial shoulders 92 therebetween. Another difference is that the outer expansion compensating member 50 is mounted outside the casing or housing 72 in an annular space or chamber 94 located between the outer surface 96 of the cylindrical portion 78 and the inner cylindrical surface of a bore 98 in a machine or motor housing 99.

The modified encased expansion compensating bearing, generally designated 100, shown in Figure 5 differs from the bearings 10 and 70 in having only a single bearing sleeve, namely the nylon bearing sleeve 30, directly engaging the outer surface 46 of the shaft 12, the inner high temperature glass bearing sleeve 32 and the inner expansion compensating member 52 being omitted. The inner cylindrical surface 34 of the nylon bearing member 30 directly engages the shaft 12 and the annular space 42 between its outer cylindrical surface 38 and the inner surface 102 of the casing or housing 104 is occupied by the single outer expansion compensating member 50. The casing 104 has rear and front end flanges or end walls 106 and 108 which overhang the ends of the nylon bearing sleeve 30 but have apertures 110 and 112 which are of larger diameter than the internal surface 34.

The modified encased expansion compensating bearing generally designated 120, shown in Figure 6 consists of a casing sleeve 122 having an internal bore 124 with an end flange 126 containing a radial annular shoulder 128 against which one end of the nylon bearing sleeve 30 is seated. The other end is engaged by a split retaining ring or snap ring 130 seated in an internal annular groove 132. The gap 134 between the opposite ends 136 and 138 of the snap ring 130 enables the latter to be sprung into the groove 132 through the smaller diameter opening at the outer end of the bore 124. The opposite end of the sleeve 122 is provided with an opening 140 closely surrounding the shaft 12. The sleeve 122, which is preferably of metal such as aluminum, is provided with an external annular groove 142 between its external surface 144 and a reduced diameter surface 146 thereof. Seated in the groove 142 and engaging the annular shoulders 148 at the opposite ends thereof is the external expansion compensating member 50 previously described, the latter engaging the bore 147 in the machine housing or other part 149.

The modified expansion compensating thrust bearing, generally designated 150, shown in Figure 7 is shown as adapted for the purpose of rotatably supporting a rotary shaft 152 in a bore 154 in a machine housing or other part 156, the shaft 152 having a flange 158 with an end thrust surface 160 thereon. Mounted in the annular space 162 between the bore 154 and the outer surface 164 of the shaft 152 is a sleeve bearing member 166 of nylon having an inner bearing surface or bore 168 engaging the shaft surface 164 and also having an end flange 170 with an inner surface 172 engaging the adjacent surface 174 of the housing 156 and having an external thrust surface 176 engaged by the thrust surface 160 of the flange 158 on the shaft 152. The outer cylindrical surface 178 of the sleeve bearing member 166 is spaced radially away from the bore 154 and in the annular space 179 thereby provided is mounted an expansion compensating member 50, as described above.

The modified encased expansion compensating bearing, generally designated 180, shown in Figure 8, is generally similar to the bearing 120 shown in Figure 6, as regards its general construction and use, but differs in certain details. The bearing 180 consists of an outer sleeve, generally designated 182, preferably of metal such as aluminum, having a bore 184 in which is mounted an inner sleeve bearing member 186 preferably of nylon as described above and having co-axial outer and inner cylindrical surfaces 188 and 190 respectively engaging the sleeve bore 184 and a shaft (not shown), such as the shaft 12 of Figure 6. As in the case of the outer sleeve 122 in Figure 6, aluminum is preferred for the outer sleeve 182 because it has a coefficient of thermal expansion somewhat similar to that of nylon. The sleeve 182 is provided on its peripheral surface 192 with an annular groove 194 having a reduced diameter surface 196 meeting the peripheral surface 192 in annular end shoulders 198. Mounted in the annular groove 194 is an expansion compensating member 50 similar to that described above and for a similar purpose.

In the operation of the expansion compensating bearing in its various forms, the rotation of the shaft 12, 84 or 152, as the case may be, even when properly lubricated, generates heat of friction and this in turn when transmitted by conduction or, to a lesser extent radiation, to the nylon sleeve bearing member 30, 166 or 186, as the case may be, causes the latter to expand because of its relatively high coefficient of thermal expansion. In the ordinary nylon bearing having no means for compensating for such expansion, the nylon bearing sleeve, being imprisoned between the shaft and the machine housing bore, cannot expand radially, and the slight amount of longitudinal expansion is insufficient to prevent constriction of the bearing upon the shaft, with resultant increase of friction, binding and eventual jamming or "freezing." In the expansion-compensating nylon bearing of the present invention, the annular split thermal expansion compensating member 50 and, where present 52, yield resiliently a sufficient amount to absorb the expansion of the nylon bearing sleeve and leave free rotation between the shaft and the bearing. The same members 50 and 52 also take up excessive clearances arising during manufacture, absorb vibration, compensate for slight misalignments, reduce the noise level, and permit circulation of air longitudinally through the compensating members 50 and 52 in order to facilitate cooling thereof.

In the operation of the encased composite bearings 10 of Figures 1 to 3 inclusive and 70 of Figure 4, the bearing engagement is between the high temperature glass inner sleeve 32 mounted on the shaft 12 or 84 and the nylon outer sleeve 30 mounted in the machine housing bore 98, with the expansion compensating members 50 and 52 absorbing the thermal radial expansion brought about by the heat of friction. The bearing 10 of Figure 1 is pushed into the machine housing bore without requiring any further expansion compensation. The bearing 70, on the other hand, because of its lack of expansion compensation means between the nylon sleeve 30 and the bearing casing 72, is preferably provided with a peripheral clearance between it and the machine housing bore 98 in order to accommodate an annular expansion compensation member 50 to absorb the expansion.

In the operation of the modified expansion compensating bearing 100 of Figure 5, the nylon sleeve 30 directly engages the shaft which it rotatably supports. Expansion compensation is provided by the annular split expansion compensating member 50 in the manner described above. Since the expansion compensation member 50 is located between the nylon sleeve bearing member 30 and the bearing casing 104, the latter is mounted snugly in the machine housing bore, such as the bore 98 in Figure 4.

In the operation of the composite bearings 120 and 180 of Figures 6 and 8 respectively, the rotation of the shaft 12 by its frictional engagement with the nylon sleeve 30 or 186 causes heat which in turn results in radial expansion of the nylon sleeve. The heat, however, is transmitted by the nylon sleeve to the aluminum outer sleeve 122 or 182 and this in turn expands radially at approximately the same rate as the nylon sleeve 30 or 186 because of their similar coefficients of thermal expansion. The expansion of the aluminum sleeve 122 or 182 is absorbed by the expansion compensating member 50, which yields sufficiently while maintaining a snug fit which prevents wobble. A sufficient clearance is of course left during manufacture between the machine housing bore 147 and the peripheral surface 144 or 192 of the aluminum outer sleeve 122 or 182, so that the latter will not directly engage the machine housing bore 147 and consequently cause constriction.

In the operation of the expansion compensating thrust bearing 150 of Figure 7, the rotation of the shaft 152 in the bore 168 of the nylon sleeve bearing member 166 generates heat of friction, as before, and this in turn results in radial expansion which is absorbed by the expansion compensating member 50 disposed in the space 179 between the sleeve 166 and the machine housing bore 154. The end thrust to the left on the shaft 152 is taken up by the engagement of the thrust surface 160 on the shaft flange 158 with the thrust surface 176 on the nylon sleeve bearing member flange 170. The resulting frictional heat and consequent radial or longitudinal expansion of the flange 170 is, however, of no consequence since there is adequate radial and longitudinal space in which to expand.

What we claim is:

1. A nylon sleeve bearing unit adapted to be mounted in a bearing mounting bore of a bearing supporting structure for rotatably supporting a rotary machine element, said bearing unit comprising a peripherally-continuous nylon sleeve having a bore therein adapted to rotatably support the rotary machine element, said nylon sleeve also having a peripheral surface dimensioned to provide a predetermined radial clearance space between it and the bearing supporting structure bore in which it is intended to be mounted, and a radially-yieldable resilient annular expansion member disposed outwardly of and in engagement with said nylon sleeve, said expansion member being of relatively thin spring material with multiple axially-elongated undulations therein spaced at intervals around the periphery thereof.

2. A nylon sleeve bearing unit adapted to be mounted in a bearing mounting bore of a bearing supporting structure for rotatably supporting a rotary machine element, said bearing unit comprising a peripherally-continuous nylon sleeve having a bore therein adapted to rotatably support the rotary machine element, said nylon sleeve also having a peripheral surface dimensioned to provide a predetermined radial clearance space between it and the bearing supporting structure bore in which it is intended to be mounted, a radially-yieldable resilient annular expansion member disposed outwardly of said nylon sleeve in radially-spaced relationship therewith, said expansion member being of relatively thin spring material with multiple axially-elongated undulations therein spaced at intervals around the periphery thereof, and a hollow cylindrical member disposed outwardly of and in engagement with said nylon sleeve and having a thermal expansion similar to the thermal expansion of said nylon sleeve, said cylindrical member having an external annular groove therein receiving said expansion member.

3. A nylon sleeve bearing unit adapted to be mounted in a bearing mounting bore of a bearing supporting structure for rotatably supporting a rotary machine element, said bearing unit comprising a peripherally-continuous nylon sleeve having a bore therein adapted to rotatably support the rotary machine element, said nylon sleeve also having a peripheral surface dimensioned to provide a predetermined radial clearance space between it and the bearing supporting structure bore in which it is intended to be mounted, a radially-yieldable resilient annular expansion member disposed outwardly of said nylon sleeve in radially-spaced relationship therewith, said expansion member being of relatively thin spring material with multiple axially-elongated undulations thereon spaced at intervals around the periphery thereof and a hollow cylindrical member disposed outwardly of and in engagement with said nylon sleeve and having a thermal expansion similar to the thermal expansion of said nylon sleeve.

4. A nylon sleeve bearing unit adapted to be mounted in a bearing mounting bore of a bearing supporting structure for rotatably supporting a rotary machine element, said bearing unit comprising a peripherally-continuous nylon sleeve having a bore therein adapted to rotatably support the rotary machine element, said nylon sleeve also having a peripheral surface dimensioned to provide a predetermined radial clearance space between it and the bearing supporting structure bore in which it is intended to be mounted, a radially-yieldable resilient annular expansion member disposed outwardly of said nylon sleeve, said expansion member being of relatively thin spring material with multiple axially-elongated undulations thereon spaced at intervals around the periphery thereof and a hollow cylindrical member disposed outwardly of said nylon sleeve in radially-spaced relationship therewith and having end portions extending radially inward adjacent the ends of said nylon sleeve, said cylindrical member cooperating with said end portions to form an annular internal recess retainingly receiving said expansion member.

5. A nylon sleeve bearing unit adapted to be mounted in a bearing mounting bore of a bearing supporting structure for rotatably supporting a rotary machine element, said bearing unit comprising a peripherally-continuous nylon sleeve having a bore therein adapted to rotatably support the rotary machine element, said nylon sleeve also having a peripheral surface dimensioned to provide a predetermined radial clearance space between it and the bearing supporting structure bore in which it is intended to be mounted, a metallic sleeve having a thermal expansion similar to the thermal expansion of said nylon sleeve disposed outwardly of and in engagement with said nylon sleeve, and a radially-yieldable resilient annular expansion member disposed outwardly of and in engagement with said metallic sleeve.

6. A nylon sleeve bearing unit adapted to be mounted in a bearing mounting bore of a bearing supporting structure for rotatably supporting a rotary machine element, said bearing unit comprising a peripherally-continuous nylon sleeve having a bore therein adapted to rotatably support the rotary machine element, said nylon sleeve also having a peripheral surface dimensioned to provide a predetermined radial clearance space between it and the bearing supporting structure bore in which it is intended to be mounted, a metallic sleeve disposed outwardly of and in engagement with said nylon sleeve, and a radially-yieldable resilient annular expansion member disposed outwardly of and in engagement with said metallic sleeve, said metallic sleeve having an annular peripheral recess therein, and said expansion member being disposed in said recess and projecting radially outward beyond the periphery of said metallic sleeve.

7. A nylon sleeve bearing unit adapted to be mounted in a bearing mounting bore of a bearing supporting structure for rotatably supporting a rotary machine element, said bearing unit comprising a peripherally-continuous nylon sleeve having a bore therein adapted to rotatably support the rotary machine element, said nylon sleeve also having a peripheral surface dimensioned to provide a predetermined radial clearance space between it and the bearing supporting structure bore in which it is intended to be mounted, a metallic sleeve having a thermal expansion similar to the thermal expansion of said nylon sleeve disposed outwardly of and in engagement with said nylon sleeve, and a radially-yieldable resilient annular expansion member disposed outwardly of and in engagement with said metallic sleeve, said metallic sleeve having an annular peripheral recess therein, and said expansion member being disposed in said recess and projecting radially outward beyond the periphery of said metallic sleeve.

8. A nylon sleeve bearing unit adapted to be mounted in a bearing mounting bore of a bearing supporting structure for rotatably supporting a rotary machine element, said bearing unit comprising a high-temperature vitreous sleeve having a bore therein adapted to receive the rotary machine element, a peripherally-continuous nylon sleeve disposed radially outward of said vitreous sleeve and having a bore rotatably supporting said vitreous sleeve, said nylon sleeve also having a peripheral surface dimensioned to provide a predetermined radial clearance space between it and the bearing supporting structure bore in which it is intended to be mounted, and a radially-yieldable resilient annular expansion member disposed outwardly of and in engagement with said nylon sleeve.

9. A nylon sleeve bearing unit adapted to be mounted in a bearing mounting bore of a bearing supporting structure for rotatably supporting a rotary machine element, said bearing unit comprising a high-temperature vitreous sleeve having a bore therein adapted to receive the rotary machine element in radially-spaced relationship providing an inner annular space therebetween, a peripherally-continuous nylon sleeve disposed radially outward of said vitreous sleeve and having a bore rotatably supporting said vitreous sleeve, said nylon sleeve also having a peripheral surface dimensioned to provide a predetermined radial clearance space between it and the bearing supporting structure bore in which it is intended to be mounted, an inner radially-yieldable resilient annular expansion member disposed in said inner annular space, and an outer radially-resilient annular expansion member disposed outwardly of and in engagement with said nylon sleeve.

References Cited in the file of this patent

UNITED STATES PATENTS

| 421,089 | Wood | Feb. 11, 1890 |
| 2,675,283 | Thomson | Apr. 13, 1954 |

FOREIGN PATENTS

| 1,047,719 | France | Dec. 16, 1953 |